(No Model.)

E. D. LARAWAY & F. C. ROCKWELL.
Combined Box and Tray Molded from Paper Pulp.

No. 240,595.        Patented April 26, 1881.

Witnesses
Wendell R. Curtis
James J. Greene

Inventor
Elbert D. Laraway
Fred C. Rockwell
By W. E. Simonds
Atty

UNITED STATES PATENT OFFICE.

ELBERT D. LARAWAY AND FRED C. ROCKWELL, OF HARTFORD, CONN.

COMBINED BOX AND TRAY MOLDED FROM PAPER-PULP.

SPECIFICATION forming part of Letters Patent No. 240,595, dated April 26, 1881.

Application filed September 17, 1880. (No model.)

To all whom it may concern:

Be it known that we, ELBERT D. LARAWAY and FRED C. ROCKWELL, of Hartford, in the county of Hartford and State of Connecticut, have invented a certain new and useful Improvement in a Combined Box and Tray Molded from Paper-Pulp, of which the following is a description, reference being had to the accompanying drawings, where—

Figure 1:
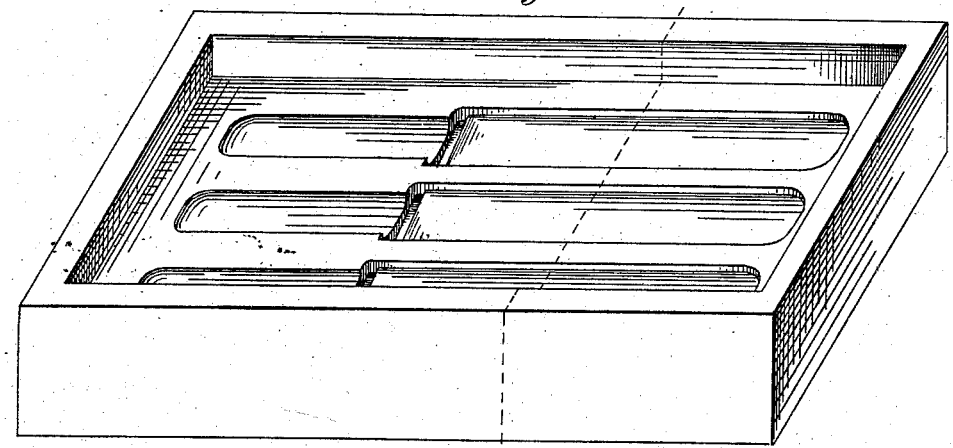
Figure 2:
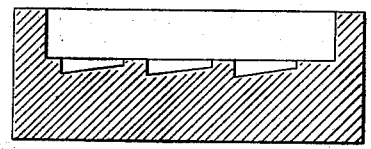
Figure 3:
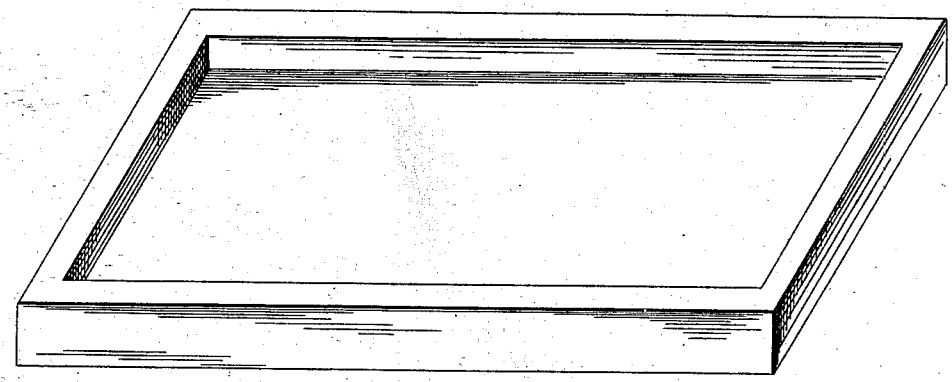

Figure 1 is a view of a combined box and tray made in accordance with our invention. Fig. 2 is a view of same, in cross-section, on plane $x\ x$. Fig. 3 is a view of a cover for this box and tray.

The improvement is a tray for holding articles—say jewelry and silverware—made integral and of homogeneous material with a box for holding the tray—i. e., the tray and box are molded in one piece from pulp.

Such trays and boxes are now commonly made from wood in separate pieces fastened together, the tray being covered on its face with black velvet and fastened into the box.

When the tray and box are formed together of pulp molded to shape the warping of both tray and box incident to the construction in wood is avoided, the expense of the cutting to form the sockets in the tray is avoided, the textile covering of the tray is rendered unnecessary, the whole structure can be made lighter, for the tray itself forms the bottom of the box, and the whole thing is rendered cheaper of production.

We claim as our improvement—

A tray with sockets and a box for containing the tray molded in one piece from pulp, substantially as shown and described.

ELBERT D. LARAWAY.
FRED C. ROCKWELL.

Witnesses:
WM. E. SIMONDS,
JAMES J. GREENE.